United States Patent Office.

FRANZ RÖHMANN AND ARTHUR LIEBRECHT, OF BRESLAU, GERMANY, ASSIGNORS TO THE FARBWERKE, VORMALS MEISTER, LUCIUS & BRÜNING, OF HÖCHST-ON-THE-MAIN, GERMANY.

DISINFECTANT AND PROCESS OF MAKING SAME.

SPECIFICATION forming part of Letters Patent No. 575,277, dated January 12, 1897.

Application filed July 1, 1896. Serial No. 597,770. (Specimens.) Patented in Germany May 6, 1894, No. 82,951; in France November 16, 1894, No. 242,933, and in England November 16, 1894, No. 22,191.

*To all whom it may concern:*

Be it known that we, FRANZ RÖHMANN, doctor of philosophy and professor of chemistry, and ARTHUR LIEBRECHT, doctor of philosophy, citizens of the Empire of Germany, residing at Breslau, in said Empire of Germany, have invented certain new and useful Improvements in the Manufacture of a New Solid Silver Compound which is not Precipitated by Albumen or Salt, (for which Letters Patent were granted to us in Germany, No. 82,951, dated May 6, 1894; in France, No. 242,933, dated November 16, 1894, and in Great Britain, No. 22,191, dated November 16, 1894,) of which the following is a specification.

We have discovered that for certain medicinal purposes it is of value to possess silver solutions, which, although not containing a free alkali, are not precipitated by albumen or by salt.

This invention consists in the manufacture of such a silver compound from casein as follows: Three kilos of an alkali salt of casein containing no free alkali, preferably the sodium salt of casein, are mixed with three hundred grams of nitrate of silver and the mixture dissolved in water by the aid of heat.

The alkali salt of casein referred to is obtained by dissolving one hundred parts by weight of casein with 3.5 parts by weight of caustic soda in water and evaporating the resulting solution *in vacuo*.

The new silver compound of casein contains about 4.3 per cent. of silver.

When this solution is mixed with alcohol, a precipitate is obtained which, after drying, forms a white powder that is soluble in water with a reaction neutral to litmus-paper and readily soluble in hot water.

Neither common salt nor albumen nor hydrogen sulfid precipitates the new compound from its solution. It is insoluble in alcohol, ether, benzene, and ligroin.

This substance differs from a mixture of the solid sodium salt of casein and silver nitrate, inasmuch as the same, on being subjected to the action of hydrogen sulfid and subsequently to ammonia, gives no precipitate of silver sulfid, but forms a clear brown solution.

In preparing the new silver compound any soluble salt of silver may be employed instead of silver nitrate.

The new compound is a disinfectant and intended to be used in place of nitrate of silver, (caustic stone.)

Having thus described our invention, we claim as new and desire to secure by Letters Patent—

1. The herein-described process of producing a solid compound of silver and casein, which consists in dissolving a neutral alkali salt of casein with a soluble silver salt in water, and precipitating the new compound by alcohol from the solution in the form of a white powder, substantially as set forth.

2. As a new product, the solid compound of silver and an alkali salt of casein, being a white powder, easily soluble in hot water, from which solution it is not precipitated by sodium chlorid, albumen or hydrogen sulfid, and insoluble in alcohol, ether, benzene and ligroin, substantially as set forth.

In testimony that we claim the foregoing as our invention we have signed our names in presence of two subscribing witnesses.

FRANZ RÖHMANN.
ARTHUR LIEBRECHT.

Witnesses:
LOUIS LIEBRECHT,
ERNST VEDTZ.